Feb. 10, 1953    D. ASHTON    2,628,137
ROLLER BEARING
Filed Jan. 6, 1951    2 SHEETS—SHEET 1
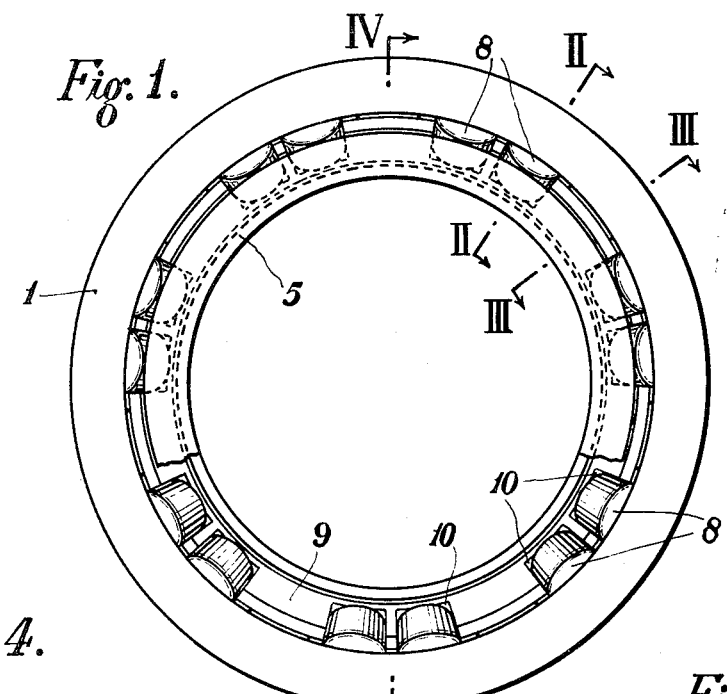
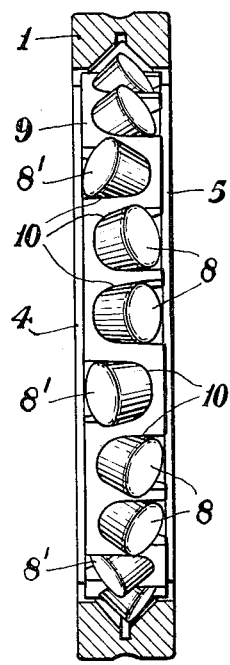
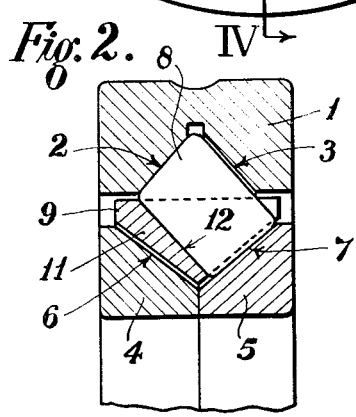
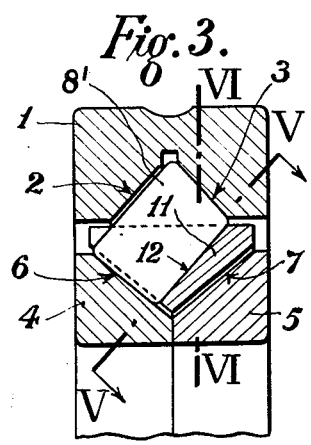
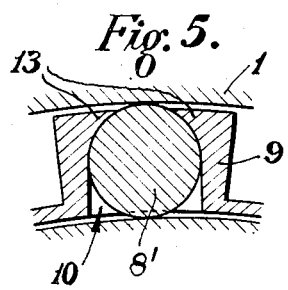
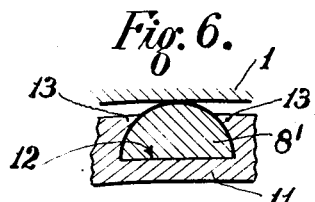
INVENTOR:
Dennis Ashton,
BY Carr Carr & Gravely,
His ATTORNEYS.

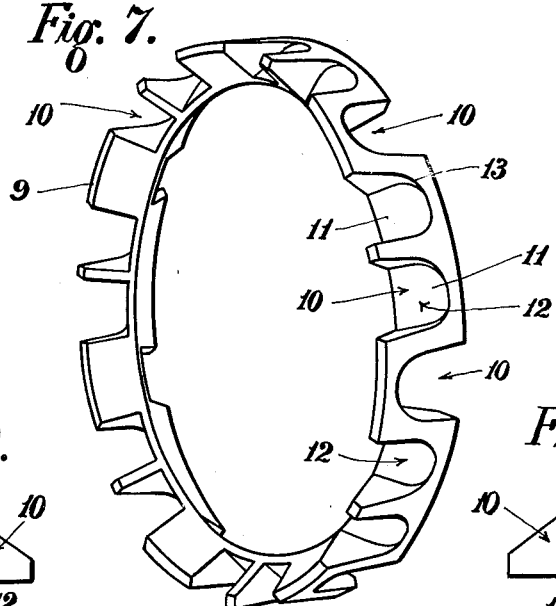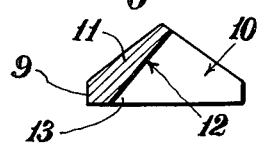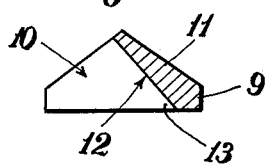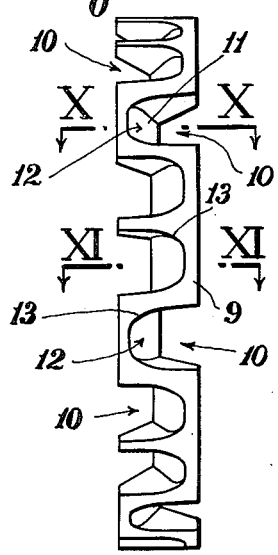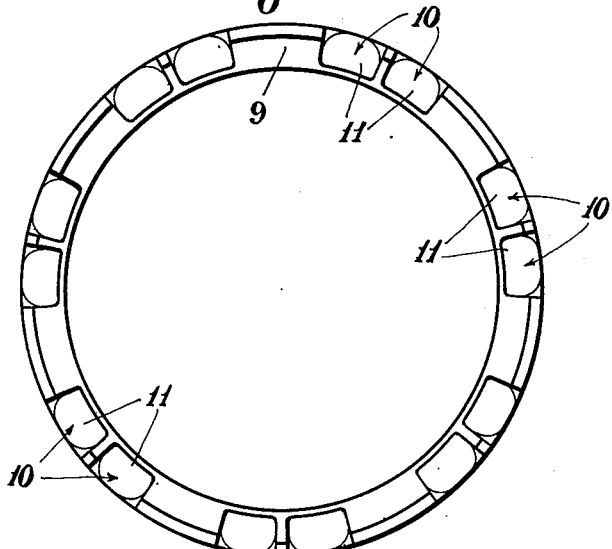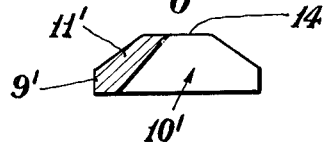

Patented Feb. 10, 1953

2,628,137

UNITED STATES PATENT OFFICE 2,628,137

ROLLER BEARING

Dennis Ashton, Birmingham, England, assignor to The Timken Roller Bearing Company, Canton, Ohio, a corporation of Ohio Application January 6, 1951, Serial No. 204,719
In Great Britain September 2, 1950

6 Claims. (Cl. 308—214)

This invention relates to tapered-roller bearings of the bi-angular or X type, comprising a single row of tapered rollers disposed between conical race surfaces on inner and outer bearing members, with the axes of certain of the rollers inclined in one direction with respect to the axis of the bearing, and with the axes of other rollers inclined in the opposite direction with respect to said axis, so that ends of one set of rollers are supported by or are opposed to a race track or surface appertaining to the oppositely-inclined set of rollers; the arrangement being such that the bearing can resist not only radial loads but also axial thrust loads acting in both directions of the bearing axis.

One object of the present invention is to provide a bearing, of the type referred to, having a cage for spacing and separating the individual rollers of both sets of rollers, which cage is of simple construction and can readily be manufactured, and which will not create undue friction or be subjected to excessive wear.

According to the invention a tapered-roller bearing of the kind referred to is provided with a cage consisting of a ring or annular body of substantially triangular shape in cross-section, with the apex portion directed radially inwards towards the axis of the bearing, said ring or annular body being formed, at opposite sides, with suitably-spaced open pockets or recesses, extending from one inclined side face to the outer periphery of the ring, for receiving the individual rollers of the two sets thereof, the pockets at each side of the ring being closed at their rear or inner ends by a sloping body wall at the other side of the ring, and all the pockets being so shaped and designed that the peripheral mouth portions thereof can rest upon the peripheries of the rollers whereby the cage is floatingly supported upon the rollers, out of contact with inner and outer bearing members.

Also, according to the invention, a cage for use in a tapered-roller bearing, of the type referred to, comprises a ring of triangular cross-section with the apex portion directed radially towards the centre of the ring to form a cylindrical outer periphery, said ring being provided at opposite sides with spaced pockets each extending from one sloping side of the ring to the outer periphery and being closed at the rear or inner end by an opposite body wall of the ring, the pockets at one side being staggered relatively to those on the other side and all the pockets having their peripheral mouth portions reduced in width towards the inner ends, so that the sides thereof can rest upon the peripheries of the rollers when the cage is assembled in a bearing.

Figure 1 of the accompanying drawings is a side elevation of a tapered roller bearing in accordance with the present invention, the lower part of one of the inner race members being shown as being broken away.

Figure 2 is a cross-section on line II—II, Figure 1, on a larger scale.

Figure 3 is a corresponding cross-section on line III—III, Figure 1.

Figure 4 is a cross-section through the outer race member on line IV—IV, Figure 1, with the cage and rollers shown in elevation.

Figure 5 is a cross-section on line V—V, Figure 3.

Figure 6 is a section on line VI—VI, Figure 3.

Figure 7 is a perspective view of the cage employed in the bearing.

Figure 8 is an edge view of the cage.

Figure 9 is a side elevation of the cage.

Figure 10 represents a cross-section through the cage on line X—X, Figure 8.

Figure 11 is a section on line XI—XI, Figure 8.

Figure 12 shows a cross-section through a slightly modified form of cage.

Referring to Figures 1 to 11 of the drawings, a tapered roller bearing of the bi-angular or X-type comprises an outer race ring 1 having around its inner periphery a groove of a wide V-section forming two oppositely-inclined conical race surfaces 2, 3, nearly at right-angles to one another; two side-by-side inner race rings 4, 5, each having a conical race track 6, 7, respectively and together forming a wide V-groove having two side-by-side race surfaces inclined in opposite directions to the bearing axis; and two sets of tapered rollers 8, $8^1$, respectively having their axes inclined in opposite directions to the bearing axis, one set of rollers 8 running between one outer race surface 2 and one inner race surface 7 and the other set $8^1$ running between the second outer race surface 3 and the second inner race surface 6, and with the larger ends of each set opposed to the outer race surface on which the other set runs; the smaller ends of all the rollers being directed inwardly towards the bearing axis, all according to the known arrangement.

In the present invention the individual rollers of both sets of rollers 8, $8^1$, are separated and spaced by a single cage 9. This cage 9 consists of a one-piece ring or annular body which initially is of a continuous solid triangular section, with the apex portion directed inwardly towards the centre, giving a flat cylindrical outer periphery. Milled or otherwise machined or formed at opposite sides of the ring are a number of suitably-spaced laterally-open pockets or recesses 10 for receiving the individual rollers, the pockets at one side being staggered in relation to the pockets at the other side. Each pocket extends obliquely from one inclined face of the ring to the outer periphery thereof, without cutting into the other inclined face. The rear or inner end of each pocket (considered in an axial direction) is closed by a sloping wall 11, being the solid sloping body wall of the ring at that side opposite to that in which the pocket is formed; and the inner surface 12 of this closure wall which terminates the recess is inclined at an angle to the bearing axis which corresponds to the angle assumed by the small end of a roller when in position in the pocket of the assembled cage. The shape and dimensions of the pockets are such that they can receive their respective rollers through their laterally-open ends, but the mouth portion of each pocket 10 is restricted in width towards the inner or closed end, the inner corner portions of the side walls of the pocket, which are adjacent the end closure wall 11, being curved towards one another, that is, in the transverse direction of the pocket, to produce curved seating lips or surfaces 13 (see Figures 5 and 6) which overlie and mate with the peripheral running surface of a roller, adjacent the smaller end thereof, when the roller is assembled in the cage with its smaller end squarely seated upon or parallel to the sloping surface 12 of the pocket closure wall 11.

The bearing is assembled by placing the cage 9 within the outer bearing member 1 and loading the rollers 8, 8¹, into the respective cage pockets 10 in an oblique direction from the inside, with the smaller ends of the rollers resting upon the sloping surfaces 12 of the end closure walls 11 of the pockets, so that the peripheral rolling surfaces of the rollers engage one of the outer race surfaces 2, 3, while the large ends of the rollers are opposed to the other outer race surface. The two inner race members 4, 5, are fitted in position after the rollers have been assembled in the two respective sides of the cage, so that the peripheral surfaces of the two sets of rollers will engage the race surfaces 6, 7, of the respective inner members.

The larger ends of the rollers will protrude in oblique directions through the outer or open end portions of the pockets 10 so that more than half their diameter will project radially outwards of the cage, but the smaller end portions are overlapped outwards of their diameter by the curved seating lips or surfaces 13 at the closed ends of the pockets, and thus radial outward displacement of the rollers relatively to the cage is prevented. Consequently, in the assembled bearing, the cage rests upon and is supported by the rollers in the upper part of the bearing by means of said seating lips or surfaces, so that, in effect, the cage floats upon the rollers and is thereby maintained out of contact with both inner and outer bearing members.

The number of pockets 10 provided in the respective opposite sides of the cage may be equal; but as shown, and to provide for unequal distribution of thrust in the two axial directions, there may be more pockets and rollers at one side of the cage than at the other.

Instead of the sides of the cage converging to a definite apex, as in Figures 1 to 11, the inner peripheral apex portion may be removed or omitted, the cage then being as at 9¹, in Figure 12, with the converging sides terminating in a flat transverse peripheral surface 14, the wall 11¹ and pocket 10¹ being of less radial depth than the corresponding wall 11 and pocket 10 in Figures 1 to 11.

I claim:

1. A tapered-roller bearing comprising, in combination, inner and outer race members having conical race surfaces; a single row of tapered rollers disposed between conical race surfaces of said inner and outer members with the axes of certain of the rollers inclined in one direction with respect to the axis of the bearing and with the axes of other rollers inclined in the opposite direction with respect to said axis; and a roller-spacing cage consisting of a ring of substantially triangular cross-section having the apex portion directed radially inwards towards the axis of the bearing, said ring being formed at opposite sides with spaced open pockets extending from one inclined side face to the outer periphery of the ring for receiving the individual rollers, the pockets at each side of the ring being closed at their rear ends by a sloping body wall at the other side of the ring, and all the pockets having overhanging parts adjacent their peripheral mouths adapted to rest upon the peripheries of the rollers whereby the cage is floatingly supported upon the rollers out of contact with the inner and outer bearing members.

2. A tapered-roller bearing comprising in combination an outer race ring having around its inner periphery a groove of V-section forming two oppositely-inclined race surfaces; two separate side-by-side inner race rings each having a conical race track and together forming a V-groove having two race surfaces inclined in opposite directions to the bearing axis; two sets of tapered rollers respectively having their axes inclined in opposite directions to the bearing axis, one set running between one outer race surface and one inner race surface and the other set running between the second outer race surface and the second inner race surface; and a roller-spacing cage consisting of a ring having sloping side surfaces converging towards the axis of the bearing, said ring having in each side spaced roller-receiving pockets extending from one inclined side face to the outer periphery of the ring and each being closed at its rear end by a sloping body wall at the other side of the ring, all the pockets having their peripheral mouth portions reduced in width towards the inner ends so that the sides thereof can rest upon the peripheries of the rollers, the cage being floatingly supported on the rollers.

3. A cage for use in a bi-angular tapered-roller bearing comprising a ring of tapering section having side faces converging towards the centre of the ring and having a cylindrical outer periphery, said ring being provided at opposite sides with spaced pockets each extending through one sloping side of the ring to and through the outer periphery and being closed at the rear by the other sloping body wall at the opposite side of the ring, the pockets at one side being staggered relatively to those on the other side and all the pockets having their peripheral mouth portions reduced in width towards the inner ends so that the sides thereof can rest upon the peripheries of the rollers when the cage is assembled in a bearing.

4. A cage for use in a bi-angular tapered-roller bearing comprising a ring of tapering section having a cylindrical outer periphery and sloping sides converging towards the centre of the ring, said ring being provided in the opposite sides with spaced pockets each extending through one sloping side of the ring to and through the outer periphery and being closed at the rear by the other sloping body wall at the opposite side of the ring, the pockets at one side being staggered relatively to those on the other side and all the pockets having at their inner ends curved seating lips adapted to overlie and mate with the peripheral running surfaces of the bearing rollers when the latter are assembled in the cage.

5. A cage for use in a bi-angular tapered-roller bearing comprising a ring of triangular section having a cylindrical outer periphery and sloping sides converging to an apex portion directed radially towards the centre of the ring, said ring being provided at opposite sides with spaced pockets each extending through one sloping side of the ring to and through the outer periphery and being closed at the rear by the other sloping body wall located at the opposite side of the ring and opposed to the smaller end of a roller, the pockets at one side being staggered relatively to those on the other side and all the pockets having their peripheral mouth portions reduced in width towards the inner ends, so that the sides thereof can rest upon the peripheries of the rollers when the cage is assembled in a bearing.

6. A tapered-roller bearing comprising in combination an outer race ring having around its inner periphery a groove of V-section forming two oppositely-inclined race surfaces; two separate side-by-side inner race rings each having a conical race track and together forming a V-groove having two race surfaces inclined in opposite directions to the bearing axis; two sets of tapered rollers respectively having their axes inclined in opposite directions to the bearing axis, one set running between an outer race surface and one inner race surface and the other set running between the second outer race surface and the second inner race surface; and a roller-spacing cage consisting of a ring of triangular section having a cylindrical outer periphery and an apex portion directed radially towards the axis of the bearing, said ring being provided at opposite sides with spaced pockets each extending through one sloping side of the ring to and through the outer periphery thereof and being closed at the rear by the other sloping body wall located at the opposite side of the ring and supporting the smaller end of a roller, the pockets at one side being staggered relatively to those on the other side and all the pockets having at their inner ends curved seating lips that overlie and can mate with the peripheral running surfaces of the rollers whereby the cage is floatingly supported on the rollers.

DENNIS ASHTON.

REFERENCES CITED

The following references are of record in the file of this patent:

UNITED STATES PATENTS

| Number | Name | Date |
| --- | --- | --- |
| 1,415,969 | Wingquist | May 16, 1922 |
| 2,430,359 | Messinger | Nov. 4, 1947 |

FOREIGN PATENTS

| Number | Country | Date |
| --- | --- | --- |
| 50,249 | Sweden | Jan. 15, 1919 |